O. H. BRIGGS.
CONVEYER CHUTE.
APPLICATION FILED MAY 7, 1912.
1,064,815.
Patented June 17, 1913.
2 SHEETS—SHEET 1.
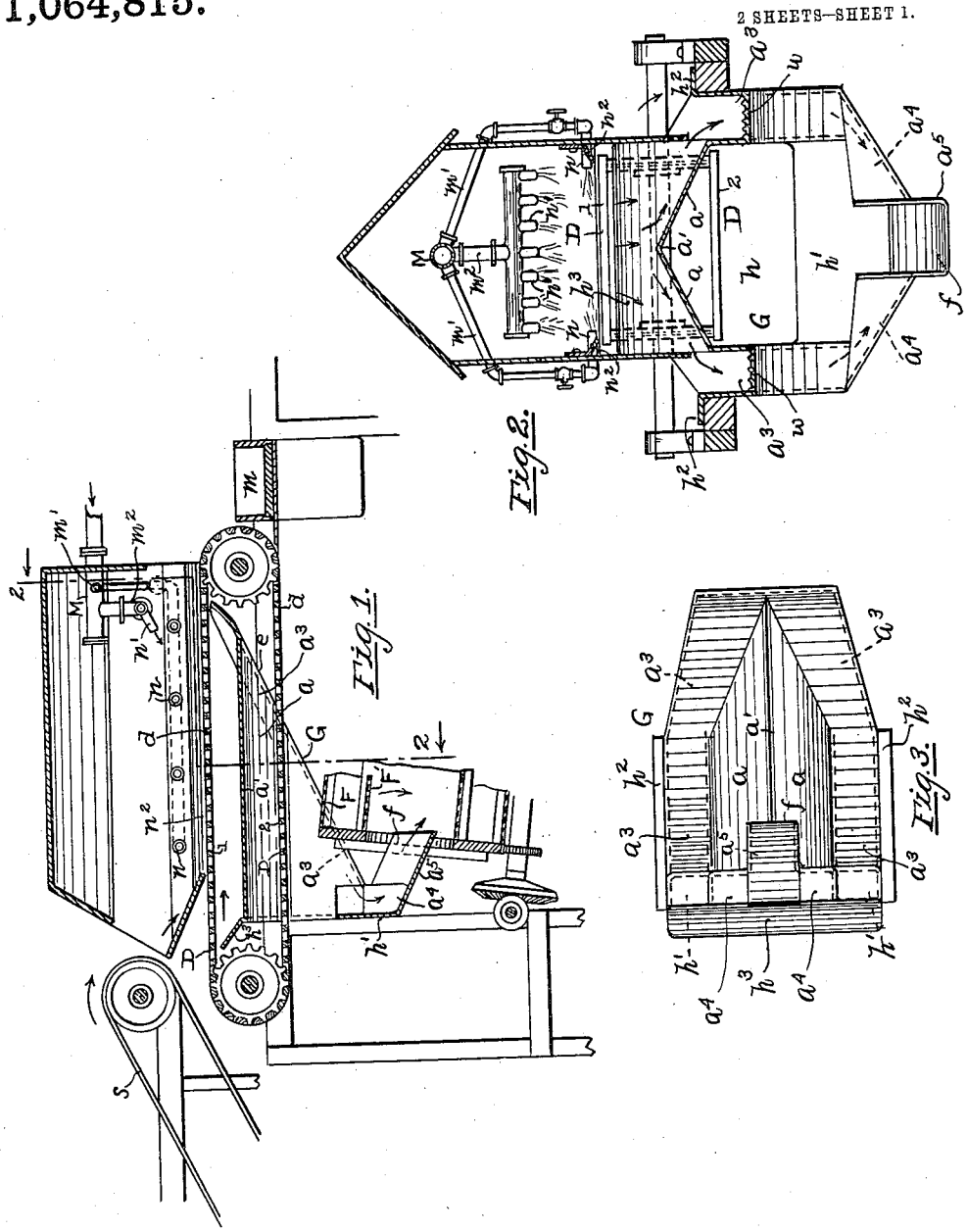
WITNESSES.
INVENTOR.
Oscar H. Briggs.
BY
ATTY.

O. H. BRIGGS.
CONVEYER CHUTE.
APPLICATION FILED MAY 7, 1912.
1,064,815.
Patented June 17, 1913.
2 SHEETS—SHEET 2.
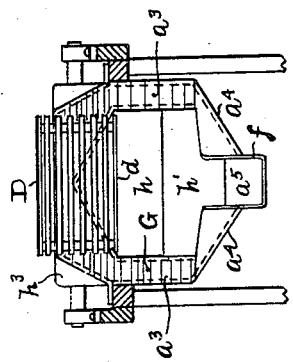
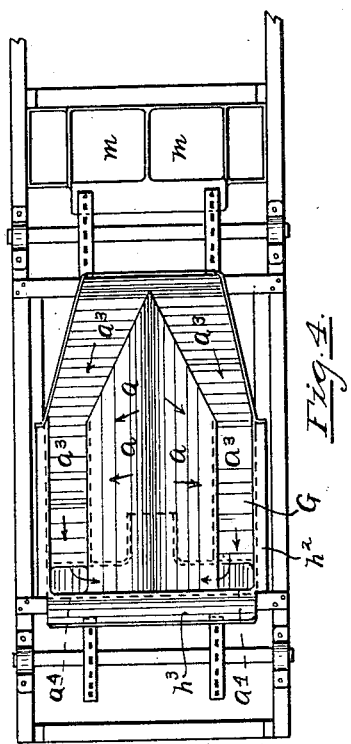
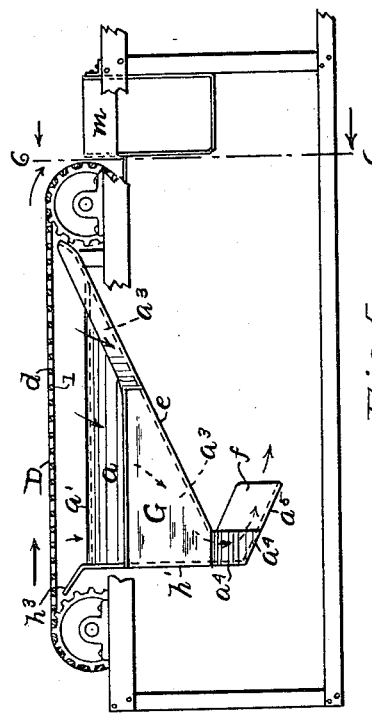
WITNESSES.
INVENTOR.
Oscar H. Briggs.
BY
ATTY.

UNITED STATES PATENT OFFICE.

OSCAR H. BRIGGS, OF PROVIDENCE, RHODE ISLAND.

CONVEYER-CHUTE.

1,064,815.

Specification of Letters Patent. Patented June 17, 1913.

Application filed May 7, 1912. Serial No. 695,657.

*To all whom it may concern:*

Be it known that I, OSCAR H. BRIGGS, a citizen of the United States, residing at Providence, in the county of Providence and State of Rhode Island, have invented certain new and useful Improvements in Conveyer-Chutes, of which the following is a specification.

In a pending application for Letters Patent filed by me in the United States Patent Office on improvements in placer mining machines (Serial Number 616,636) certain improvements in conveyer chutes were represented, but not claimed in said application. The present application relates to improvements in conveyer chutes and more especially to the conveyer chute represented in said application.

The object I have in view is to increase the efficiency of conveyer chutes of the relatively stationary type, whereby the material acted upon, such for example, as clay, gravel and ore-carrying material in its passage downward along the chute is separated or disintegrated in a more thorough and rapid manner than is effected by means of conveyers as usually devised.

In the accompanying two sheets of drawings, Figure 1 represents a view in partial side elevation and longitudinal section of my improved stationary conveyer chute showing the latter normally positioned with relation to portions of a mining machine, as in use; Fig. 2 is an enlarged transverse sectional view, taken substantially on line 2—2 of Fig. 1; Fig. 3 is an inverted plan view of the conveyer chute; Fig. 4 is a top plan view of the conveyer chute showing it mounted on a suitable supporting frame; Fig. 5 is a corresponding side elevation showing the device disposed with relation to a movable table or grizzly; and Fig. 6 is an end elevation of the conveyer chute, viewed substantially from line 6—6 of Fig. 5.

In order to more clearly describe the manner of employing my improved conveyer chute I have represented it associated with portions of a mining machine, which latter may be briefly referred to as follows:—$s$ indicates an endless belt arranged to deliver value-carrying or other material onto a moving table or grizzly D, consisting of longitudinally spaced rods or bars $d$. If desired, the said material may be surface-washed by means of water under pressure carried in main M, a header $m^2$ having nozzles $n^1$, lateral pipes $m^1$ having their lower ends passing through side plates $n^2$ and ending in nozzles $n$. The waste material is discharged from the grizzly into chutes $m$ leading to a dump. The grizzly represented has open upper and lower sides 1 and 2, respectively, substantially as common.

The conveyer chute G, constituting the subject of the present application, is formed from sheet metal, as steel. The device consists of oppositely inclined, longitudinally extending imperforate sides $a$, $a$, diverging in a downward direction from the upper horizontal central apex $a^1$; the lower edges $e$ of said sides are also beveled or inclined downwardly from the rear end of the ridge or apex $a^1$ and are constructed to form open side troughs or what may be termed sub-chutes $a^3$, each having a substantially U-shape, transversely; the outer vertical side walls thereof terminating in a continuous flange $h^2$. The lower forward ends of the troughs $h^3$ merge into short, inwardly facing transversely disposed, downwardly inclined troughs or chutes $a^4$, in turn merging into a central open terminal spout $f$ having a downwardly inclined base $a^5$. The opposite or front end $h^1$ of the conveyer chute is vertical and provided with an opening $h$ therethrough, said end member having its upper portion $h^3$ extending rearwardly at an angle a short distance above and transversely of the apex $a^1$, as clearly shown.

My improved stationary conveyer chute G may be mounted and adapted for normal use as follows:—That is to say, the device may be positioned relatively to a moving grizzly so that the material carried by the latter is surface-washed in its passage, the material not exceeding the size of the spaces between the bars or rods of the grizzly, together with the used water, at the same time falling onto the sloping sides $a$ of the chute in open communication, respectively, with the downwardly inclined troughs $a^3$, in turn directly connected to the inwardly facing transverse troughs $a^4$, and into the open central spout $f$. The latter may, if desired, be positioned to discharge the washed and disintegrated material into the mouth of revolubly mounted cylindrical screens, substantially as indicated in Fig. 1 at F.

It may be added that my improved conveyer chute is constructed so that its upper portion is adapted to be positioned immediately below the upper table 1 of the grizzly and extend centrally longitudinally of it, thereby permitting the conveyer to receive on its beveled sides practically all the material as it flows or passes downward through the upper table, and at the same time deflect it into the several downwardly inclined troughs which merge finally into a single discharge passage $f$. The sides $a$, $a$, are separated at the base or lower edges to allow the bottom portion 2 of a grizzly to travel freely therebetween; the said forward end $h^1$ having an opening $h$ therethrough for a similar reason.

I claim as my invention:

1. As an improved article of manufacture, a conveyer chute of the general character described, consisting of oppositely disposed longitudinally extending sides diverging downwardly from a common ridge or apex, an inclined outer trough located at the lower edge of each of said sides in open communication therewith, inwardly facing lateral troughs into which said side troughs discharge located at the lower end of the conveyer, and a common outlet in open communication with said lateral troughs.

2. The improved conveyer chute substantially as herein described, the same comprising a pair of longitudinally extending downwardly divergent sides united at the top, each of said sides having its lower edge provided with a trough parallel therewith, inwardly facing transverse shorter troughs leading, respectively, from the lower ends of said side troughs, and a discharge outlet intersecting the transverse troughs, constructed and arranged whereby, when mounted and positioned as in use, disintegrated material, as clay, &c., continuously collected in the longitudinal troughs, flow downwardly therein and are deflected into said transverse troughs in open communication with the discharge outlet.

3. An integral conveyer chute consisting of a pair of downwardly divergent imperforate sides connected together at the top, the lower edge of each side being inclined downwardly toward the lower end of the device, side troughs in open communication with the imperforate sides at their lower edges, means terminating in a common discharge outlet communicating with said side troughs arranged to conduct material from the latter by gravity, and means for securing the conveyer chute in a normally stationary position.

In testimony whereof I have affixed my signature in presence of two witnesses.

OSCAR H. BRIGGS.

Witnesses:
H. L. BRIGGS,
GEO. H. REMINGTON.